United States Patent
Lazenby et al.

(10) Patent No.: US 7,517,317 B2
(45) Date of Patent: Apr. 14, 2009

(54) SUBARRAY FORMING SYSTEM AND METHOD FOR ULTRASOUND

(75) Inventors: John C. Lazenby, Fall City, WA (US); David A. Petersen, Fall City, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 659 days.

(21) Appl. No.: 10/788,103

(22) Filed: Feb. 26, 2004

(65) Prior Publication Data

US 2005/0192499 A1    Sep. 1, 2005

(51) Int. Cl.
A61B 8/00    (2006.01)

(52) U.S. Cl. .................. 600/459; 600/447; 600/472; 73/584

(58) Field of Classification Search ............. 600/459, 600/447, 472; 73/584
See application file for complete search history.

(56) References Cited

U.S. PATENT DOCUMENTS

| | | | |
|---|---|---|---|
| 5,229,933 A * | 7/1993 | Larson, III ............... | 600/459 |
| 5,520,187 A * | 5/1996 | Snyder ..................... | 600/459 |
| 5,675,554 A | 10/1997 | Cole et al. | |
| 5,832,923 A * | 11/1998 | Engeler et al. ............ | 600/459 |
| 5,902,241 A * | 5/1999 | Seyed-Bolorforosh et al. ......................... | 600/443 |
| 6,028,484 A | 2/2000 | Cole et al. | |
| 6,174,286 B1 | 1/2001 | Ramamurthy et al. | |
| 6,183,419 B1 * | 2/2001 | Wildes ..................... | 600/447 |
| 6,524,254 B2 * | 2/2003 | Erikson .................... | 600/447 |
| 2005/0148873 A1 | 7/2005 | Petersen et al. | |
| 2005/0148878 A1 | 7/2005 | Phelps et al. | |

* cited by examiner

Primary Examiner—Brian Casler
Assistant Examiner—Parikha S Mehta

(57) ABSTRACT

Different subarray combinations are provided for ultrasound imaging. A basic building block component supports different subarray sizes. Rather than providing a switching network for all possible combinations, a transducer array is divided into super arrays. Each super array is associated with a plurality of possible subarrays. For example, a 3×12 block of elements is divisible into four 3×3 or three 3×4 subarrays. As another example, a 4×12 block of elements is divisible into four 4×3 and three 4×4 subarrays. For each super array, the block of elements is divided into slices, such as three slices along one dimension for 3×12 block or four slices along that dimension for the 4×12 block. The number of elements along one division in each slice represents a least common multiple of the varying extent of the subarray sizes. Twelve is the least common multiple of three and four. By using small building blocks, the slice inputs are combined into partial subarrays. By summing combined outputs from different slices or other subdivisions of the super array, subarray signals are provided regardless of a selected possible subarray size.

20 Claims, 2 Drawing Sheets

SUBARRAY FORMING SYSTEM AND METHOD FOR ULTRASOUND

BACKGROUND

The present invention relates to combining elements into subarrays. In particular, the outputs of different groups of elements are combined to form subarrays for ultrasound imaging.

Signals from different elements are combined to form subarrays. The use of subarrays may minimize the number of receive beamformer channels used in an ultrasound imaging system or the number of cables to communicate the signals from the elements to the ultrasound imaging system. For example, a two-dimensional transducer array is divided into a number of pre-set subarrays. Signals from elements within a same subarray are combined together and transmitted through a cable to an ultrasound imaging system. The number of subarrays corresponds to the number of cables and receive beamformer channels of the imaging system. However, a different transducer design and associated subarray combinations may be needed for systems with different numbers of receive beamformer channels to provide similar imaging performance. Providing different electronics or transducer arrays is expensive. Alternatively, less than all of the elements are used where an imaging system has fewer receive beamformer channels than subarrays. This reduction in aperture may result in lower resolution or lower performance imaging.

U.S. application Ser. No. 10/741,827 filed Dec. 19, 2003 and U.S. application Ser. No. 10/741,538 filed Dec. 19, 2003, the disclosures of which are incorporated herein by reference, disclose altering the size of subarrays as a programmable trade off between the number of transducer array elements and the number of receive beamformer channels. The size, shape or location of subarrays may be dynamically varied. Electronics are provided in the transducer assembly for implementing the subarray variation. The electronics provide time division multiplexing or partial beamforming for the subarrays. The electronics allow variation in subarray size for use with a same ultrasound imaging system.

BRIEF SUMMARY

By way of introduction, the preferred embodiments described below include methods and systems for forming subarrays in ultrasound imaging. Electronic switching between various subarray sizes is provided. A basic building block component is provided that supports the different subarray sizes. Rather than providing a switching network for all possible combinations, a transducer array is divided into super arrays. Each super array is associated with a plurality of possible subarrays. For example, a 3×12 block of elements is divisible into four 3×3 or three 3×4 subarrays. As another example, a 4×12 block of elements is divisible into four 4×3 and three 4×4 subarrays. For each super array, the block of elements is divided into slices, such as three slices along one dimension for 3×12 block or four slices along another dimension for the 4×12 block. The number of elements in one dimension of each slice represents about a least common multiple of the varying dimensions of the possible subarray sizes. Twelve is the least common multiple of three and four. Rather than using a building block with inputs that are the least common multiple of 36 and 48, a component is provided where the inputs are the greatest common divisor of 36 and 48 or 12. Different block sizes for the super array, subarray sizes within a given super array, slice sizes and combinations of components may be used. By using small building blocks corresponding to multiple subarrays but not the entirety of the subarrays, versatility is provided without large numbers of switches. Partial subarrays are formed by each building block. By summing combined outputs (partial subarrays) from different slices or other subdivisions of the super array, full subarrays are provided.

Various aspects and advantages are provided by the preferred embodiments. In a first aspect, a system for selecting subarrays in ultrasound imaging is provided. A transducer array has a plurality of elements. At least a first combiner is connectable with a first subset of the plurality of elements. The number of elements of the first subset along a first dimension is substantially the least common multiple of at least two possible subarray sizes along the first dimension.

In a second aspect, a method for combining ultrasound signals for a subarray is provided. A subarray size is determined from at least two possible subarray sizes. Switches of a first component are configured as a function of the determined subarray size. The first component is operable with any of at least two possible subarray sizes.

In a third aspect, a system for combining information from a plurality of elements into subarrays is provided. A multidimensional transducer array has a plurality of elements. The plurality of elements is grouped into a plurality of super arrays. A set of combiners connects with each of the super arrays. An output of each of the combiners in each of the set of combiners corresponds to a subarray.

The present invention is defined by the following claims, and nothing in this section should be taken as a limitation on those claims. The aspects discussed above or further aspects used independently or in combination are disclosed herein and may later be claimed. Further aspects and advantages of the invention are discussed below in conjunction with the preferred embodiments.

BRIEF DESCRIPTION OF THE DRAWINGS

The components and the figures are not necessarily to scale, emphasis instead being place upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

To more likely match the number of channels from a transducer to the number of cables or receive beamform channels of an imaging system, partial beamforming, multiplexing, or other signal combination processes are used. For example, signals from a plurality of elements are combined together by summation for partial beamforming or are combined into different time slots on a same output for time division multiplexing. Where a same transducer is operable to connect with different ultrasound imaging systems having different numbers of receive beamformer channels or a cable having different numbers of coaxial cables, different subarray sizes allow use of an entire or desired aperture of the multidimensional or other array. The subarray size is electronically changed by providing slices or groupings of the subarrays common to multiple subarrays. The size of each slice along one dimension is the least common multiple of the various subarray slices along the dimension. For example, subarrays of 1×3 or 1×4 elements are provided. A slice of twelve elements is connected to a same building block component. For multidimensional arrays, multiple components corresponding to slices common to at least one subarray are provided.

Figure 1:
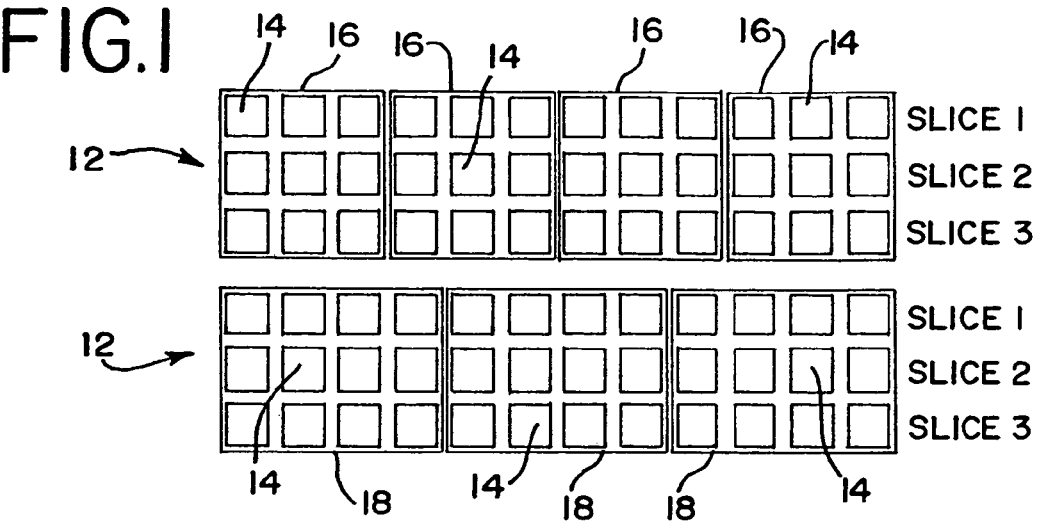
FIG. 1 is a graphical representation of different subarray sizes for a multidimensional super array of elements in one embodiment.

FIG. 1 shows a super array 12 of elements 14 divided into two different possible subarray configurations. The super array 12 is represented by 3×12 block of elements 14. A plurality of super arrays 12 are provided for each transducer array. In one embodiment, the transducer array is a multidimensional transducer array, such as a two-dimensional, 1.5, 1.75 or other multidimensional array. Any of various fully or partially sampled array patterns or grids may be used, such as square, rectangular, triangular, hexagonal or other grids. As shown in FIG. 1, a fully sampled square or rectangular grid of elements 14 is provided. In one embodiment, a 48×48 square grid of transducer elements is divided into a 4×4 arrangement of super arrays, such as super arrays representing 4×12 groupings of elements. In another embodiment, a 36×36 square grid of elements is provided with a 3×12 or 3×9 arrangement of super arrays. Non-square or grids with different distributions or numbers of elements or super arrays may be used. Each of the elements 14 are piezoelectric, membrane or other now known or later developed devices for transducing between electrical and acoustical energies. In alternative embodiments, a one-dimensional array of elements is provided. A super array extends over multiple possible subarrays within the one-dimensional transducer array.

As shown in FIG. 1, the 3×12 super array 12 is divisible into four 3×3 subarrays 16 or three 4×3 subarrays 18. Other size subarrays or a combination of different sized subarrays in a same super array 12 may be provided in alternative embodiments. For example, 2×2 or 2×3 subarrays are alternatively or additionally provided. As yet another example, each super array 12 includes a 4×12 block of elements. The super array 12 is divisible into 4×4 or 4×3 subarrays.

Each of the super arrays 12 is represented by a plurality of slices, such as groupings of a subset of elements 14 of the super array 12 along a single dimension. As shown in FIG. 1, three different slices are provided for the 3×12 super array 12. Each slice is a 1×12 subset of elements 14 of the super array. In alternative embodiments, one or more slices correspond to multiple rows of elements 14, such as two rows of elements 14. The number of elements 14 along one dimension for each slice is substantially equal to the least common multiple of the possible subarray sizes. As shown in FIG. 1, the least common multiple along the dimension that varies for subarray sizes is 12 (i.e. 3×4).

The super array 12 is divided into four subarrays for one combination and three subarrays for another combination. As a result, the electrical components for each slice have at least four outputs, one for each possible subarray. For a larger super array 12, such as a 4×12 grouping of elements 14, additional slices are provided. For example, four slices are provided. Slices extend along a dimension where the subarray size varies. Different slices are distributed over a dimension that is unvarying in the subarray size. In alternative embodiments, a super array 12 of elements 14 is divided into slices, each slice representing two rows of elements.

Figure 2:
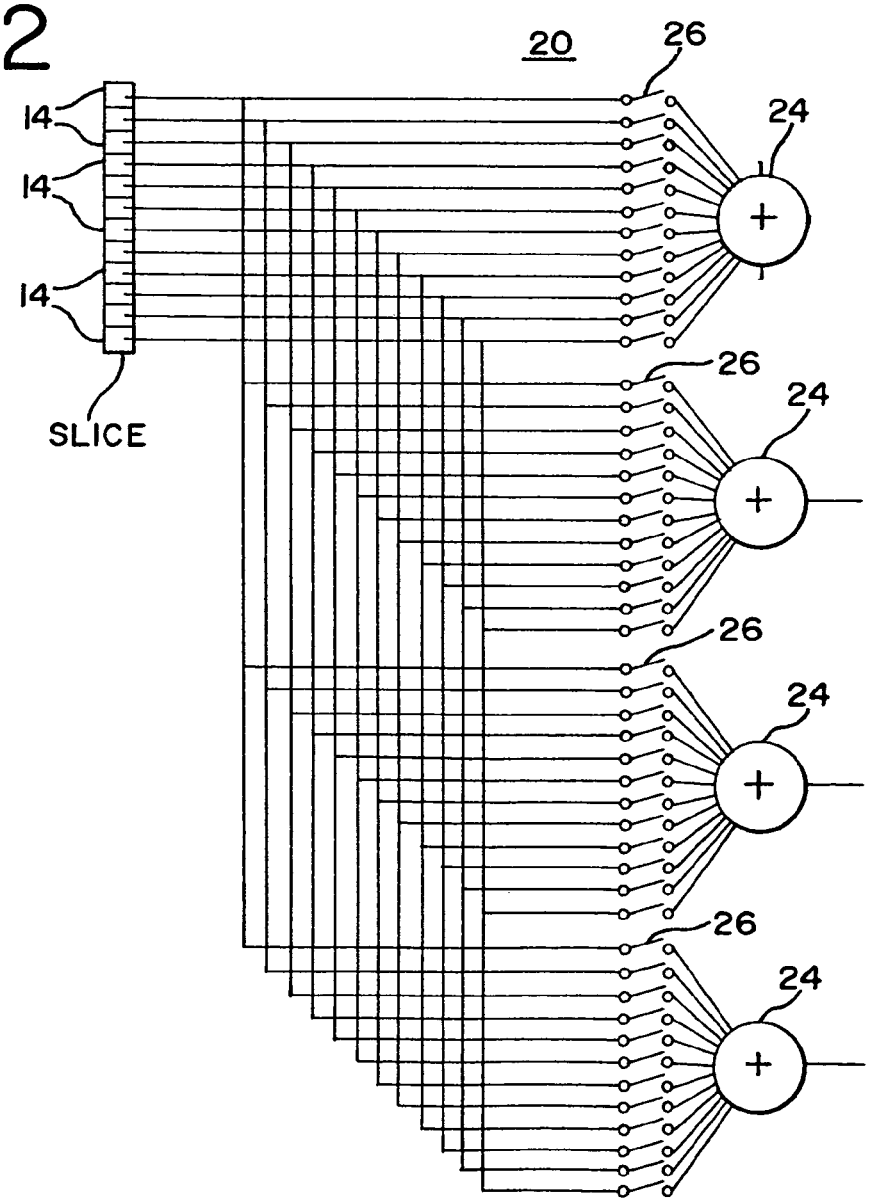
FIG. 2 is a circuit diagram of one embodiment of a component for combining information for parts of subarrays.
Figure 3:
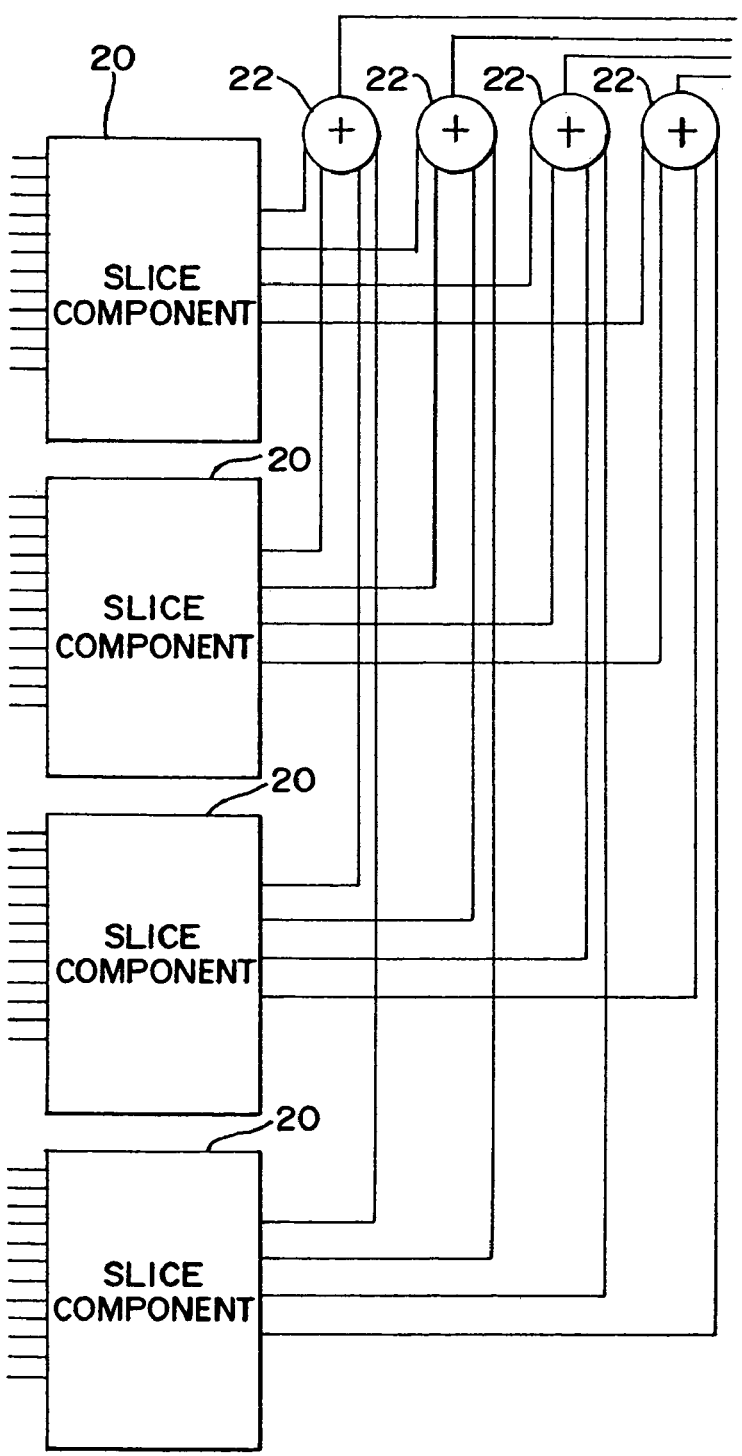
FIG. 3 is a block diagram of one embodiment of a system for forming a plurality of subarrays.

Each slice corresponds to a same type of component, but different components may be used. As a result, a same component may be used for forming different sizes of subarrays. FIGS. 2 and 3 show one embodiment of a system for selecting subarrays by combining information from a plurality of elements into the subarrays. FIG. 2 shows a component 20 corresponding to a slice or subset of elements 14. FIG. 3 shows combining information from a plurality of the components 20 to form outputs corresponding to the subarrays. As shown in FIG. 3, a set of subarray combiners 22 is connected with a plurality of components 20 corresponding to a super array 12. Each of the subarray combiners 22 connects with a plurality of slice combiners 24. Each group of slice combiners 24 connects with a subset, such as a row, of elements within a plurality of corresponding subarrays. The slice combiners 24 combine information along one dimension within each subarray, and the subarray combiners 22 combine information across a second dimension of the subarray, such as an elevation dimension. Referring to FIG. 1, the slice combiners 24 combine information along the azimuth or the dimension that varies in size for each subarray (e.g., along the slice dimension). The subarray combiners 22 combine information perpendicular to the slice dimension or along the elevation dimension.

In the example of FIG. 1, the larger 3×4 subarrays 18 are used with imaging systems or cables having a lower channel count. For example, systems with 128 or 192 receive beamformer channels are matched up with a corresponding number of larger subarrays 18. For use of the same transducer with an imaging system having a greater number of receive beamformer channels, such as 256 receive beamformer channels, the smaller 3×3 subarrays 16 are used. Depending on the number of transducer elements, 4×3 and 4×4 possible subarrays are used or 3×3 and 3×4 possible subarrays are used.

In an alternative embodiment, the number of slices in any super array 12 is selectable. As a result, a super array 12 corresponds to either a 3×12 or 4×12 block in one example embodiment. While two different possible subarray sizes are provided in each of the example embodiments discussed above, three or more different possible subarray sizes may be provided in alternative embodiments.

The same components or design is used across various platforms, reducing cost for multidimensional transducer arrays. The same transducer array may be connected to imaging systems with different numbers of receive beamformer channels. A same or substantially same number of elements are used regardless of the number of receive beamformer channels. The subarray size is varied instead. Substantially at least accounts for elements corresponding to partial subarrays at the edge of the transducer array which may not be included or used for imaging. In alternative embodiments, the aperture within the multidimensional transducer array varies as a function of the number of receive beamformer channels.

Referring to FIG. 2, each component 20 includes a plurality of switches 26 and slice combiners 24. The component 20 of FIG. 2 has four groups of switches 26 corresponding to four slice combiners 24. A switch 26 is provided in each group of switches 26 for each of the elements 14 of a slice. In alternative embodiments, one or more of the connections from an element 14 to a slice combiner 24 is permanent or unswitched as either a closed or open connection, resulting in a fewer number of switches 26 in each plurality of switches 26. A greater or fewer number of switch groupings may be used in other embodiments. A greater or fewer number elements 14 for a given slice may be used in other embodiments.

Each switch 26 is a transistor, relay, Gilbert cell, or other now known or later developed analog or digital switch. In one embodiment, each of the switches 26 is a single pole switch. In other embodiments, each of the switches 26 is multiple transistors in a current switching configuration. In yet other alternative embodiments, each of the switches 26 represents a combination of switches for implementing time division multiplexing or subarray mixing as shown in U.S. application Ser. No. 10/788,021 filed Feb. 26, 2004, the disclosure of which is incorporated herein by reference. In this embodiment, each switch 26 represents four switches. Of the four switches, two different pairs of switches respond to the same control signals but connect to differential outputs of the signals from the elements 14. By selecting between inverted and non-inverted inputs with a relative phase of the switching, the input signal is mixed with a local oscillation signal for eventual combination with other mixed signals. For time division multiplexing, the off state of the group of switches is maintained until a time slot for the input signal is selected. During the time slot, the input signal is output in the non-inverted state. Other now known or later developed switches and switching configurations may be used.

The switches 26 are operable to connect different elements 14 along the slice dimension of the super array 12 to different slice combiners 24. Elements 14 of different subsets are connected to different slice combiners 24. One set of switches 26 connects a first group of elements 14 within the slice subset to the first slice combiner 24. The second group of switches 26 is configured in open and closed configurations to connect the different elements 14 of the subset to the second combiner 24. For example, the switches 26 are configured such that the elements 14 for slice number 1 shown in FIG. 1 are connectable to three or four different slice combiners 24 to form the three or four partial subarrays 16, 18. In this configuration, three or four elements connect with the first slice combiner 24, a different three or four elements connect with the second slice combiner 24, a different three or four elements connect with the third slice combiner 24, and no or three elements connect with the fourth slice combiner 24.

Each slice combiner 24 connects with a number of elements 14 corresponding to the selected one of the possible subarray sizes. At least the number of elements 14 in the subarray that vary between two different size subarrays are provided to one, more or all the slice combiners 24. For example in FIG. 1, the subarrays vary along one dimension between three or four elements. Three or four elements connect to the different slice combiners 24. Where the slice combiners 24 of each component 20 connect all elements of a slice into different partial subarrays, substantially all of the plurality of elements of a transducer array are connected to substantially all of the receive beamformer channels of an ultrasound imaging system by substantially matching the array size to the number of available beamformer channels. A larger subarray size is provided for a lower number of receive beamformer channels, and a smaller subarray size is provided for a higher number of receive beamformer channels. In the embodiments described above, each element 14 connects to one of the slice combiners 24. In alternative embodiments, the switches 26 are operable to connect a same element 14 to more than one slice combiner.

Each of the slice combiners 24 is a connection of traces from the switches 26, an operational amplifier, a digital summer, an analog summer, a multiplexer, switches or other now known or later developed device for combining multiple inputs onto a same output. Each of combiners 24 is connectable with a subset of elements, such as connectable with all or fewer than all of the elements 14 associated with a slice of a super array 12. In this embodiment, each of the slice combiners 24 within the component 20 are connectable with a number of elements that is substantially the least common multiple of the possible subarray sizes along the slice dimension. Substantially is used to account for additional or fewer elements being used where lesser performance may be acceptable. As shown in FIG. 2, the least common multiple of 12 elements 14 is used, such as associated with possible subarray sizes of three and four elements along the slice dimension.

Multiple slice combiners 24 in the same component allow selectable or configurable groupings of elements 14 corresponding to different subarrays. For example, four slice combiners 24 are provided for the four possible subarrays in the twelve element slice example given above. Each of the slice combiners 24 connects with a different subset of elements 14 of the slice subset of elements of the super array 12. Each of the slice combiners 24 is operable to output combined output signals corresponding to the different subarrays or combinations of different elements into partial subarrays. For example, each of the four slice combiners 24 outputs a combination of three elements of the 3×3 element subarray 16 shown in FIG. 1. Alternatively, three of the slice combiners 24 outputs a combination of different groupings of four elements corresponding to the 3×4 subarrays 18 of the super array 12 shown in FIG. 1. The fourth slice combiner does not output a signal or the output signal is not used. The component 20 forms four 1×3 or three 1×4 partial subarrays. Each of the partial subarrays corresponds to the portion of the subarray along a same slice or subset of elements in a one dimensional configuration. For example, the first four switches 26 are closed to form one of three partial subarray output signals. The fifth through eighth switches 26 connected with the second slice combiner 24 are closed to form a second 1×4 partial subarray, and the ninth through twelfth switches 26 connected with the third slice combiner 24 are closed to form a third 1×4 partial subarray. For four 1×3 partial subarrays, the first through third, fourth through sixth, seventh through ninth and tenth through twelfth switches 26 are closed for each of the first through fourth slice combiners 24, respectively.

In one embodiment, the component 20 is implemented as an application specific integrated circuit. Twelve inputs corresponding to connections for twelve elements 14, and four outputs corresponding to each of the slice combiners 24 are provided. In alternative embodiments, greater or fewer inputs and outputs may be used. Inputs are also provided for controlling the switches 26. In one embodiment, the application specific integrated circuit includes preamplifiers and/or other now known or later developed circuitry for combining signals from multiple elements 14 onto a single output. In alternative embodiments, an FPGA, separate digital or analog components, multiple separate groups of devices, or other now known or later developed devices or arrangements of devices are used to implement the component 20.

Referring to FIG. 3, four different components 20 are shown. Alternatively, a fewer or greater number of components, such as three components 20, may be used. In the configuration shown in FIG. 3, each of the components 20 corresponds to a different slice within a super array 12. For example, four components 20 correspond to four elevationally spaced rows of elements. The components 20 shown in FIG. 3 have twelve inputs corresponding to twelve elements in azimuth being used for each of the elevationally spaced slices. Since each of the components 20 includes multiple slice combiners 24, multiple groups of slice combiners 24 connectable with subsets of elements 14 are provided for each of the rows of elements 14. Each of the components 20 is a separate device, such as a separate application-specific integrated circuit. In alternative embodiments, one or more of the components 20 are combined into a same device. Each of the components 20 has a same or similar arrangement of switches 26 and slice combiners 24 for forming partial subarrays as discussed above with respect to FIG. 2. Each of the components 20 is operable to output up to four signals as shown in FIG. 3, such as either of three or four signals depending on a subarray size. In alternative embodiments, up to three, up to two or up to a number greater than four outputs are provided. In an alternative embodiment, three components 20 are provided instead of four components 20. Other numbers of components 20 may be used. The three component embodiment is used where three slices form the super array 12 corresponding to the three elements along the elevation dimension of each subarray 16, 18.

The subarrray combiners 22 are a connection of signal lines, a digital summer, an analog summer, a multiplexer, switches, operational amplifier, or other now known or later developed device for combining signals from multiple inputs onto a single output. Each of the subarray combiners 22 connect with a same output of different components 20. The same output corresponds to a slice combiner 24 output associated with a same subarray across slices. For example, a first subarray combiner 22 connects with slice combiners 24 of different components associated with different slices of the same subarray 16, 18. The subarray combiner 22 combines the information from different slices for each subarray to form a subarray output signal. Where the subarray corresponds to a multidimensional grouping of elements, such as a 3×3, 4×3 or 4×4 grouping of elements, the set of subarray combiners 22 output signals corresponding to different multidimensional subarrays within the same super array 12.

Additional devices may be provided, such as switches for implementing time division multiplexing as part of the combination. Time division multiplex signals from different slice combiners 24 are further time division multiplexed to provide a subarray output corresponding to all of the elements within the subarray having signals in different time slots. Alternatively, the multiplexing prior to the slice combiner accounts for the signals from other slices. Other additional circuitry may be provided.

The number of subarray combiners 22 corresponds to the maximum number of subarrays possible for the super array 12. While four subarray combiners 22 are shown, fewer or more subarray combiners 22 may be provided. Additional levels of combination may be provided, such as combining subarray signals from multiple subarray combiners 22 to form yet a larger subarray signal.

The slice components 20 are each wired to different subsets of elements within the super array 12. By connecting the outputs of the slice components 20 with the subarray combiners 22, the super array 12 is defined. The structure shown in FIG. 3 is repeated for a plurality of super arrays 12 for a given transducer. In one embodiment, the same slice component 20 is used with different size transducer arrays for imaging systems having different numbers of receive beamformer channels. The slice components 20 are mounted to a circuit board. The outputs of the slice components 20 are wired together in the pattern shown in FIG. 3. The wired connections act as the subarray combiners 22. The same electronics are used on different systems with different channel counts. The number of subarray combiners 22 corresponds to or is the same as the number of receive beamformer channels or cables. Varying numbers of slice components 20 are used depending on the number of subarrays and number of transducer elements 14. This versatility allows a substantially same lateral or elevation beam width independent of the number of coaxial cables or receive beamformer channels. The same number of elements or substantially same number of elements may be used with different imaging systems. By providing slice components 20 for connections with only a portion of multiple subarrays, the same slice component 20 is used independent of the number of transducer elements, the number of coaxial cables or the number of receive beamformer channels. Costs are reduced by providing a common component for use with different platforms.

Figure 4:
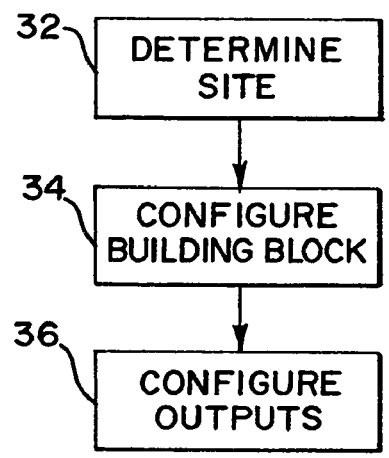
FIG. 4 is a flow chart diagram of one embodiment of a method for forming subarrays of different sizes using a common component.

FIG. 4 is a flow chart diagram of one embodiment of a method for combining ultrasound signals in subarrays. The method is implemented using the circuits described above for FIGS. 2 and 3 or different circuits. Additional, different or fewer acts than shown in FIG. 4 may be provided.

In act 32, a subarray size is determined from at least two possible subarray sizes. The determination is made during manufacture in one embodiment, but may be implemented using control signals during use in other embodiments. For example, control signals indicate a system identification, a number of receive beamformer channels or number of coaxial cables that may be switchably or detachably connected with the transducer assembly. The determination of subarray size is performed in response to connection with different imaging systems.

The subarray size out of the possible subarray sizes is determined as a function of the number of elements of a transducer array and the number of system channels. The number of elements may be set during manufacture. "System channels" is used herein to include channel limitations due to the number of coaxial cables, other transmit bandwidth limitations or limitations on the number of receive beamformer channels. For example, a subarray size resulting in the use of substantially all of the desired elements within an aperture, such as all of the elements of the transducer array, is selected to provide a number of outputs substantially matched to the number of system channels. For example, one of 3×4 or 3×3 subarrays are selected. Larger or smaller subarrays may be selected. More than two possible subarrays sizes may be provided. Combinations of different subarray sizes within a same super array or within a same overall aperture may also be used. As another example, the subarray size is selected as one of 3×4 and 4×4.

In act 34, a component is configured as a function of the determined subarray size. For example, the switches of a building block component operable with any of the possible subarray sizes are configured for operating with the selected subarray size. Where the components connect with a subset of the elements of the transducer array extending into at least two subarrays, the switches are configured to form partial subarrays along the dimension of variation. For example, different groups of elements are connected to three or four different combiners depending on whether the 3×3, 3×4, 4×4, or 3×4 subarray sizes is selected.

Where the configured components connect with a different slice or any two or more subarrays, the switches of the different components are also configured. For example, three separate components are connected into three slices of about twelve elements along an azimuth dimension. The elements connected with the three different components are spaced in three rows along elevation, respectively. The switches for each component are configured to combine information from different partial subarrays. As another example, four separate components are provided within a super array, such as a 4×12 super array. The switches of the four components are configured to combine information to form partial subarrays. In one embodiment, each component connects with about twelve elements along the azimuthal dimension, and the elements connected with the components are spaced in four separate rows. 4×3 or 4×4 subarrays are two possible sizes in this embodiment.

Other subarray sizes may be used. For example, 2×2 subarrays are possible where switching of the component outputs is provided to different subarray combiners. Two components are used to form two slices supporting any number of subarrays, such as six subarrays. In another embodiment, eight of the elements of a 12-element slice are connected into four 1×2 partial subarrays. By using four outputs, some of the elements of a super array may be unused. 2×3, 2×2, 2×4 and 3×4 subarrays are possible in the configuration. As an alternative, 2×2 subarrays are provided by connecting one component to two rows of elements. Other even numbered sized subarrays in the elevation dimension may be provided by connecting a same component to two rows. In the example given above, connecting twelve inputs to a 2×6 grouping of elements allows selection between 2×2 and 2×3 subarrays. The outputs of the components may be the outputs provided to the system channels, or further combinations may be provided for forming other subarrays, such as 4×2 and 4×3 subarrays selection.

In act 36, outputs from different components are connected into subarrays corresponding to the selected subarray size. For example, outputs from three separate components are connected together using any of various possible combiners to provide subarrays of 3×4 or 3×3 elements. For 3×4 elements, three different combined signals are formed. For 3×3 subarrays, four different combined signals are formed. The signals are formed with a same circuit regardless of the subarray size in one embodiment. One connected group of outputs is not used for larger subarray sizes. In alternative embodiments, the subarray size is selected during manufacture so that the desired number of combiners or output connections is provided as a function of the selected subarray size, such as four connected groups of outputs for 3×3 arrays or three connected groups of outputs for 3×4 arrays. Another example is provided by subarrays having four elements along one dimension and a variable number of elements along another dimension. The outputs from two, three or four components are then connected together to form subarray outputs corresponding to the desired subarray size, such as 4×4 and 3×4 subarrays. While slices are described above generally for one-dimensional distribution of elements, slices or other subgroupings associated with two rows of azimuthally spaced elements, other multi-dimensional sizes, or other multi-dimensional shapes may be used.

The different subarrays are used for any of various types of imaging. For example, pulsed wave imaging for B-mode or Doppler modes use the subarrays. The subarray signals are partially beamformed signals in one embodiment, but may represent multiplexed or other separable combinations of information. Any now known or later developed process for using the subarray signals may be provided.

In one embodiment, the subarrays are used for pulsed wave imaging and the same circuitry is also used for steered continuous wave imaging. For steered continuous wave imaging, the elements 14 connected with a slice combiner 24 are selected as a function of phase relationships. Elements associated with similar phases are connected together to a same combiner. For example, four different outputs are provided for four different phases using the circuitry of FIGS. 2 and 3. The switches 26 are configured to connect the different elements of a super array of 4×12 elements into similar phase groupings. To increase the number of possible phases combined together, signals with a similar phase are combined with signals with a 180 degree phase difference. Using an inverter on a combiner, an inverted output of a differential output amplifier or other now known or later developed mechanism, one group of waveforms with similar phases are inverted and combined with another group of waveforms having a substantially similar phase, but about 180° out of phase with the other group. Four outputs are provided for each super array associated with eight different phases. Substantially similar phase is used herein to account for phases within 4, 8, or other number of possible phase ranges in a 360 degree or 2π radians limit. For imaging systems having a fewer number of system channels, the steered continuous wave signals are grouped into three combined outputs associated with three or six phases. The phase adjustments or relative phasing between different combined signals is performed by the received beamformer of the imaging system or other electronics. In alternative embodiments, relative phase adjustments are provided in part or in total within the component 20, prior to the component 20 or prior to the subarray combiners 22.

By providing a separate switch 26 for each element 14 connection with a slice combiner 24, maximum flexibility and interconnectivity is provided. For the element mapped steered continuous wave discussed above, the switching flexibility allows for connection of elements with similar phases to a same combiner 24 regardless of the steering angle. For use without steered continuous wave imaging, some of the connections from the elements 14 may be permanent or only provided to one or fewer than all of the combiners 24.

While the invention has been described above by reference to various embodiments, it should be understood that many changes and modifications can be made without departing from the scope of the invention. For example, an elevation subarray variation is provided with or without variation in the azimuth subarray. Variations in hex or triangular grids (along one or more of three axes) may also be used.

It is therefore intended that the foregoing detailed description be regarded as illustrative rather than limiting, and that it be understood that it is the following claims, including all equivalents, that are intended to define the spirit and scope of this invention.

We claim:

1. A system for selecting subarrays in ultrasound imaging, the system comprising:
    a multi-dimensional transducer array having a plurality of elements; and
    at least a first combiner configured to connect with a first subset of the plurality of elements, wherein the first subset includes a number, N, of transducer elements where N is a common multiple of the sizes of at least two different subarrays located along a first dimension of the transducer, the at least two subarrays available for use by the first combiner along the first dimension, each subarray comprising at least two elements in the first subset, wherein the combiner is configured to beamform or separably combine signals from the elements of one of the subarrays.

2. The system of claim 1 wherein the number is the least common multiple.

3. The system of claim 1 wherein the at least two subarray sizes available for use by the combiner comprise three and four element subarray sizes, the number being twelve; and
    wherein the at least a first combiner comprises at least four combiners, each of the at least four combiners connectable with each element of the first subset.

4. The system of claim 1 further comprising:
    a second combiner; and
    a plurality of switches configured to connect elements of the first subset to the first combiner and at least said second combiner, each of the first and second combiners configured to output respective first and second combined output signals corresponding to combinations of different elements into one of the at least two subarray sizes available for use by the combiner along the first dimension.

5. The system of claim 1 wherein the transducer array comprises at least first and second rows of elements, the first subset of elements being in the first row of elements;
further comprising:
at least a second combiner configured to connect with a second subset of the plurality of elements, the second subset of elements being in the second row of elements; and
at least a third combiner configured to combine a first output of the first combiner with a second output of the second combiner, a third output of the third combiner corresponding to the one of the subarrays, wherein the one of the subarrays comprises a multi-dimensional subarray.

6. The system of claim 5 wherein the first combiner is in a first component and the second combiner is in a second component separate from the first component.

7. The system of claim 6 wherein the third combiner comprises a connection of the first output with the second output.

8. The system of claim 1 wherein the transducer array comprises a multi-dimensional array;
further comprising:
a first plurality of switches configured to operate with the first combiner to form a first group of elements in the first dimension, the first group of elements being within the first subset;
at least a second combiner configured to connect with the plurality of elements;
a second plurality of switches configured to operate with the second combiner to form a second group of elements in the first dimension spaced from the first group along a second dimension; and
a connector of outputs from the first and second combiners, the connector operable to form the one of the subarrays having the first and second groups of elements.

9. The system of claim 1 further comprising:
a plurality of switches configured to connect elements of the first subset to the first combiner and at least a second combiner, the switches connecting a first element to the first combiner and a second element to the second combiner for a first subarray size of the at least two sub array sizes available for use by the combiner, the first subarray size configured to match substantially all of the plurality of elements to substantially all of receive beamformer channels of an ultrasound imaging system.

10. The system of claim 9 wherein the first subarray size is provided for a first number of receive beamformer channels and a second subarray size is provided for a higher number of receive beamformer channels than the first number of receive beamformer channels.

11. A method for combining ultrasound signals for a subarray, the method comprising:
(a) determining a subarray size from at least two subarray sizes available for use;
(b) configuring switches of a first component as a function of the determined subarray size, the first component configured to operate with any of the at least two subarray sizes available for use; and
(c) combining signals from elements of each subarray of the subarray size onto respective beamformer channels as a function of the configuring of the switches, the combining being operable with any of the at least two subarray sizes, each of the at least two subarray sizes being less than an entire array;
wherein (a) comprises determining as a function of a number of elements of a transducer array and a number of system channels.

12. The method of claim 11 wherein (b) comprises configuring the switches of the first component, the first component connected with a subset of the elements of the transducer array, a number of elements in the subset being a least common multiple of the subarray sizes available for use in a first dimension.

13. The method of claim 11 wherein (a) comprises selecting one of 3×4 and 3×3;
wherein (b) comprises connecting elements along a first dimension in groups to different ones of three and four combiners, respectively.

14. The method of claim 13 further comprising:
configuring switches of second and third components separate from the first component, the first, second and third components each connected with about twelve elements along a first dimension spaced in three rows, respectively; and
connecting outputs from the first, second and third components into the one of three and four subarrays corresponding to the selected 3×4 and 3×3, respectively.

15. The method of claim 11 wherein (a) comprises selecting one of 3×4 and 4×4;
wherein (b) comprises connecting elements along a first dimension in groups to different ones of three and four combiners, respectively.

16. The method of claim 15 further comprising:
configuring switches of second, third and fourth components separate from the first component, the first, second, third and fourth components each connected with about twelve elements along a first dimension spaced in four rows, respectively; and
connecting outputs from the first, second, third and fourth components into the one of three and four subarrays corresponding to the selected 4×4 and 3×4, respectively.

17. A system for combining information from a plurality of elements into subarrays, the system comprising:
a multi-dimensional transducer array having the plurality of elements, the plurality of elements grouped into a plurality of super arrays; and
a set of combiners connected with each of the super arrays, an output of each of the combiners in each set of combiners corresponding to a subarray;
wherein each combiner of the set of combiners of a super array connects with a plurality of slice combiners, each slice combiner connected with different rows of elements within a corresponding subarray, each combiner of the set of combiners combining across a first dimension of the corresponding subarray and each slice combiner combining across a second dimension different than the first dimension.

18. The system of claim 17 further comprising:
a plurality of switches for each slice combiner, the switches configured to connect different elements along the second dimension of the super array to the different slice combiners.

19. A system for selecting subarrays in ultrasound imaging, the system comprising:
a multi-dimensional transducer array having a plurality of elements;
a plurality of components each connected with a different group of the elements, the components comprising:
a plurality of first combiners each configured to combine separate signals from connected elements onto a common output; and
a plurality of switches configured to connect different sets of the group of elements to different ones of the first combiners as a function of a subarray size;

a plurality of second combiners connected with the components, the second combiners configured to combine sets of the separate common outputs of the first combiners into a fewer number of subarray signals.

20. A method for combining ultrasound signals for a subarray, the method comprising:

determining a subarray size as a function of a number of cables or beamformer channels;

grouping elements into subsets each extending over a plurality of subarrays of the determined subarray size;

combining separate signals from the elements of each subset for a same subarray, the combination providing a common output for each of the subarray and subset combinations; and combining the common outputs for the same subarrays.

* * * * *